COLOR TELEVISION

Filed May 26, 1954 3 Sheets-Sheet 1

INVENTOR.
DALTON H. PRITCHARD
BY
[signature]
ATTORNEY

INVENTOR.
DALTON H. PRITCHARD
BY
[signature]
ATTORNEY

April 8, 1958 D. H. PRITCHARD 2,830,112

COLOR TELEVISION

Filed May 26, 1954 3 Sheets-Sheet 3

INVENTOR.
DALTON H. PRITCHARD
BY
[signature]
ATTORNEY

United States Patent Office 2,830,112

Patented Apr. 8, 1958

2,830,112

COLOR TELEVISION

Dalton H. Pritchard, Princeton, N. J., assignor to Radio Corporation of America, a corporation of Delaware Application May 26, 1954, Serial No. 432,413

20 Claims. (Cl. 178—5.4)

The present invention relates to a method for matrixing three component color television signals from two prescribed chrominance signals of predetermined phase, and in particular refers to a circuit means for obtaining $R-Y$, $G-Y$, and $B-Y$ signals from what are termed X and Z signals which may, for example, have a phase difference of 50.6° with the X signal lagging the $B-Y$ signal by a phase angle of 102.2°.

Color television is the reproduction on the viewing screen of a receiver of not only the relative luminance or brightness, but also the color hues and saturations in the original scene. Luminance, hue, and saturation form the three independent attributes of color vision. Luminance is that characteristic of colors that is transmitted by ordinary black-and-white or monochrome television systems. Hue is the characteristic by means of which colors may be placed in categories such as red, green, yellow, blue, and so on. Saturation represents the degree by which a color departs from a gray or a neutral of the same brightness and may also be thought of as related to the physical purity or the amount of white light which is mixed or added to a hue.

The electrical transfer of images in color may be accomplished by additive methods; color images may be transferred by analyzing the light from an object into not only image elements, as is accomplished by a normal scanning procedure, but also by analyzing the light from elemental areas of objects or images into selected primary or component colors and deriving therefrom a signal representative of each of the selected component colors. A color image may be reproduced at a remote point by appropriate reconstruction from a component color signal train. According to standards for the transmission of color television signals which were approved by the Federal Communications Commission on December 17, 1953, the color television signal which is used for commercial color television transmission in the United States contains several types of signals. In addition to the normal scanning synchronization signals which are also used for standard monochrome transmission, the color television signal also includes a luminance signal, a chrominance modulated color subcarrier which contains information relating to hue and saturation, and a color synchronizing burst, which as will be seen, synchronizes the color circuits of a color television receiver with a master oscillator at the transmitter.

Consider first the nature of the luminance signal; it is important that the luminance signal permit the color television system to be a compatible one, that is that the signal produced by the color television signal provide service to black-and-white receivers. This is accomplished in a color television system by adding signals from component red, green and blue image pickup tubes in proportion to the relative luminosities of the brightness. If the three primaries are mixed together in the proportions given by the following equation $$Y=.30R+.59G+.11B \qquad (1)$$

a suitable monochrome signal will be formed which will contain information from black through all shades of gray to white. This signal should be generated in accordance with existing scanning standards and be treated exactly like a standard monochrome signal with respect to bandwidth and the addition of synchronizing and blanking pulses.

Consider also the fundamental nature of the chrominance modulated color subcarrier. It follows from Equation 1 that if luminance information is transmitted according to the relationship observed in Equation 1, then the red, green, and blue signals required for the image reproducer in the color television receiver may be provided by transmitting what are called chrominance or color difference signals, namely $R-Y$, $G-Y$, and $B-Y$ signals. When considered in combination they indicate how each color in the televised scene differs from a monochrome version of that color of the same luminance.

The actual transmission of the color difference signals is accomplished by phase and amplitude modulation of a color subcarrier wherein the phase of the resultant chrominance modulated color subcarrier has a phase angle which yields an indication of hue while the subcarrier amplitude, when considered along with the corresponding luminance level, gives an indication of saturation. The precise nature of the color content of the chrominance modulated color subcarrier will be discussed in detail later in the specification, but it is sufficient to recognize at this point that in addition to the $R-Y$, the $B-Y$, and the $G-Y$ signals there is also included a wide variety of color information running the color gamut from red, purple, blue, cyan, green, yellow and black to red depending on the precise phase angle in the chrominance modulated subcarrier. Any of these color signals may be recovered by the processes of synchronous detection, that is, the beating of the chrominance modulated color subcarrier with a locally generated subcarrier signal of proper phase. In order that coherence be achieved between the phases of the chrominance modulated color subcarrier and the local subcarrier source in the color television receiver. A synchronizing burst of at least 8 cycles of the subcarrier frequency is transmitted on the back porch interval following each horizontal synchronizing pulse.

If three color difference signals $R-Y$, $B-Y$, and $G-Y$ are directly synchronously detected from the chrominance modulated color subcarrier, three synchronous demodulators are required with associated phase shifting networks, filters and circuitry. Since the color difference signals are actually interrelated, it has been found convenient in many color television systems to demodulate only two of the color difference signals, say the $R-Y$ signal and the $B-Y$ signal which, as will be seen, are in phase quadrature. It can be shown that because of the interdependence of the color difference signals the $G-Y$ signal will be recovered by cross-mixing the $R-Y$ and the $B-Y$ signals according to the relationship.

$$G-Y=-.51(R-Y)-.19(B-Y) \qquad (2)$$

Though some simplification of circuitry is achieved by employing this approach, it is clear from Equation 2 that inverting circuits and adding circuits will be necessary to achieve the recovery of three color difference signals.

The present invention offers a novel and unique method of achieving color difference signals in an unusual matrix circuit termed the X, Z matrix which utilizes two synchronously detected signals denoted as X and Z signals, the X signal containing cyan information and the Z signal containing yellow-green information. By use of the unique circuit to be described, the $G-Y$, the $R-Y$ and the $B-Y$ signals are easily produced at high level, and indeed with full D.-C. restoration, as afforded by a type of synchronous detector to be described, so that the $G-Y$, the $R-Y$, and the $B-Y$ signals may be applied directly to the color image reproducer thereby eliminating the necessity of the elaborate and complicated matrix and amplifier systems.

It is therefore a primary object of this invention to provide a simplified means for producing $R-Y$, $G-Y$, and $B-Y$ signals in a color television receiver.

It is still another object of this invention to provide a means for producing a trio of color difference signals from a pair of chrominance signals which are not in phase quadrature.

It is yet another object of this invention to provide a simplified means of producing color difference signals at a high amplitude level in a color television receiver.

It is yet a further object of this invention to provide a simplified means of producing color difference signals in a color television receiver with full D.-C. restoration.

It is still a further object of this invention to provide a simplified matrix amplifier circuit which will accept an input of two signals of prescribed phase to yield an output of three signals of related phase to the phases of the input signal.

Accordingly, in one form of this invention a special three tube amplifier-adder network is utilized which has a common cathode resistor and in which the grid of one of the three amplifier tubes is at ground potential. By proper choice of the magnitude of the cathode resistor and the transconductances of the three amplifier tubes, by applying a Z signal which leads the burst by 27.2° to one of the two ungrounded grids of the amplifier-matrix circuit and by applying an X signal which leads the Z signal by 50.6° to the grid of the second of the amplifier tubes which does not have ungrounded grid, signal addition is produced in the amplifier-matrix system whereby $R-Y$, $G-Y$, and $B-Y$ signals appear in the output circuits of the respective amplifier tubes.

In another form of the invention the amplifier-adder network may be utilized to accept a pair of signals of predetermined phase but of the same frequency to yield a trio of signals of the same frequency but having individual phases dependent upon the characteristics and circuit parameters of the amplifier-adder network.

In still another form of the invention, the invention as applied to color television receivers may be combined with a unique type of synchronous detector so that high level color difference signal detection may be achieved with complete D.-C. restoration.

Other and incidental objects of this invention will become apparent upon a reading of the following specification and an inspection of the accompanying drawings in which.

Figure 1:
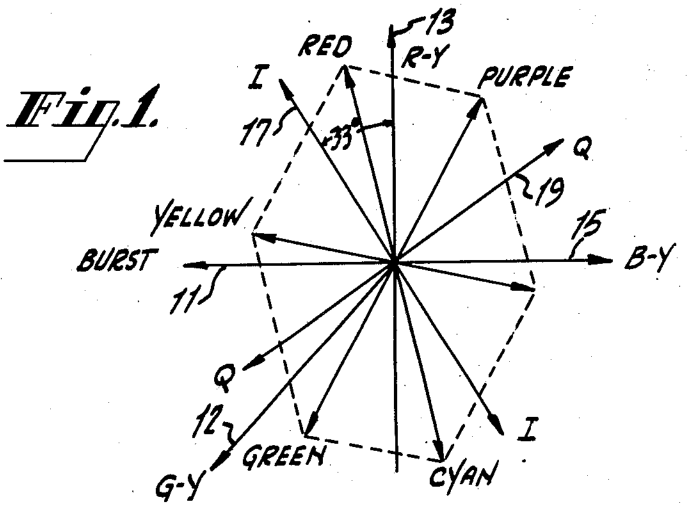
Figure 1 shows a vector diagram which relates hue to phase angle in the chrominance modulated color subcarrier.

Before turning to the present invention, consider first the relationship between the phase angles and the hues in a chrominance modulated color subcarrier. As shown in Figure 1, the burst signal 11 is in quadrature with the $R-Y$ signal 13 in turn is in quadrature with the $B-Y$ signal 15. The phase angle, as has been mentioned, gives a good indication of hue while the subcarrier amplitude when considered along with the corresponding luminance level, gives an indication of saturation. White or neutral colors fall at the center of the diagram since these produce no subcarrier component. Any given chrominance or color difference signal then corresponds to an axis or a line on the vector diagram shown in Figure 1. If for example it is desired that $R-Y$, $B-Y$, and $G-Y$ signals be recovered from the chrominance modulated color subcarrier, then synchronous detection at the various phase angles shown in Figure 1 can be utilized to recover these color difference signals.

Note the I signal 17 and the Q signal 19 which are in phase quadrature and where the I signal lags the $R-Y$ signal 13 by 33°. The I signal 17 yields color information along principally an orange-cyan axis while the Q signal 19 yields information along principally a green-purple axis. A discussion of the nature of the I and Q signals will serve to further clarify the nature of the chrominance modulated color subcarrier. The color subcarrier frequency is approximately 3.58 mc. The upper edge of the video band which can be utilized for transmitting picture information is approximately 4.2 mc. in order that the sound information at 4.5 mc. does not contaminate the video information. Since only ½ mc. of spectrum bandwidth exists between the color subcarrier frequency of 3.58 mc. and the upper edge of the picture band, it is necessary to limit any upper sidebands which are associated with the color subcarrier to approximately ½ mc. Below the color subcarrier a range of approximately 1½ mc. is available before the chrominance sidebands will interfere with the luminance picture information in an unbalanced demodulator. For this reason the Q information is transmitted having a bandwidth of approximately ½ mc., and therefore forms a double sideband array of sidebands around the color subcarrier. The I signal information is transmitted whereby it flanks the color subcarrier in the form of a double sideband signal for color components up to ½ mc. and a single sideband signal for color components from ½ mc. to approximately 1½ mc. For this reason the bandwidth of the signals at varying degrees of phase in the chrominance diagram shown in Figure 1 varies, with the signals at or near the I signal angle, which is a signal for which the eye has highest acuity, having larger bandwidth than those signals which are in the vicinity of the Q signal angle, the eye having lesser acuity for green and purple information. In many types of color television receivers the I and Q signals are demodulated directly and recombined in suitable proportions to form $R-Y$, $B-Y$, and $G-Y$ signals. In still other types of color television receivers, as has been mentioned, the $R-Y$, the $B-Y$, and the $G-Y$ signals are demodulated directly to give adequate color resolution even though the high bandwidth potentialities of the I signal are not completely utilized.

Figure 2:
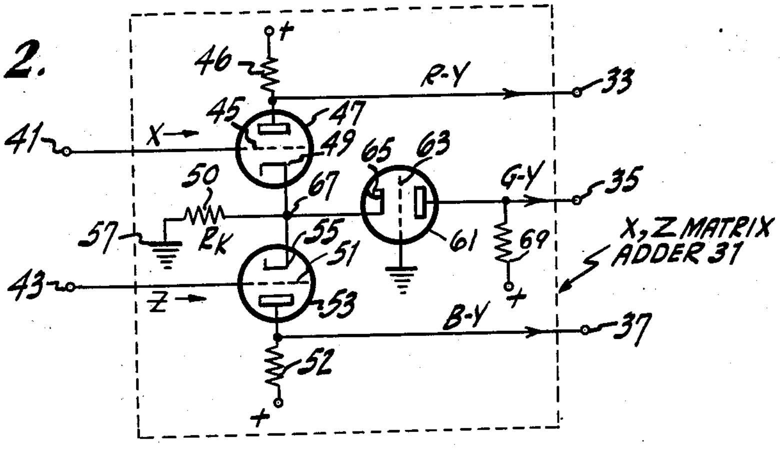
Figure 2 shows an X, Z matrix-adder which performs the function of amplification and addition to yield the $R-Y$, $G-Y$ and $B-Y$ signals from the X and Z signals.

Before considering the overall circuit diagram of a color television receiver, consider first the X, Z matrix-adder 31 which illustrates one embodiment of the present invention. It is the purpose of this X, Z matrix-adder 31 to yield at its output terminals 33, 35, 37 $R-Y$, $G-Y$, and $B-Y$ signals respectively in response to a pair of input signals applied to the input terminals 41 and 43. The signals applied to the input terminals 41 and 43 are denoted as X signals and Z signals respectively. Note that the X signal as applied to the input terminal 41 is applied to the grid 45 of the vacuum tube 47 while the Z signal which is impressed at the input terminal 43 is applied to the grid 51 of the vacuum tube 53. Vacuum tubes 47 and 53 have their cathodes 49 and 55 coupled through a common resistor 50 to ground 57. The common resistor 50 has a value of $R_K$. As is shown in Figure 2, the vacuum tubes 47 and 53 employ the output load resistors 46 and 52 respectively.

Also associated with the X, Z matrix adder 31 is the third vacuum tube 61 whose control grid 63 is tied to ground so far as color difference signals are concerned, and whose cathode 65 is tied to the common terminal 67 of the cathodes 49 and 55 of the vacuum tubes 47 and 53, respectively. Vacuum tube 61 has as its output load the resistor 69. Coupled to the output loads 46, 69 and 52 are the output terminals 33, 35 and 37 as shown.

This particular embodiment of the present invention will cause an $R-Y$ signal to appear at the output terminal 33, a $G-Y$ signal to appear at the output terminal 35 and a $B-Y$ signal to appear at output terminal 37 in response to X and Z signals having phases which have yet to be determined, these signals being applied respectively to the control grids 45 and 51. By use of the common cathode resistor 50 the three vacuum tubes 47, 61 and 53 form a three-tube matrix adder circuit with the signal addition due to the X and Z signals forming vector summations of signals across the cathode resistor 50. These vector summations which are formed across the cathode resistor 50 are then caused to yield the proper color difference signals at the output terminals in a manner which is clearly described in the following development.

Assume, for example, the condition whereby in each of the three amplifier tubes $$g_m \times R_k = 1 \qquad (3)$$

where $g_m$ is the transconductance of the tube. Then the voltage across the resistance $R_k$ can be expressed as the simultaneous equations $$[X-(G-Y)]+[Z-(G-Y)]+[O-(G-Y)]=G-Y \qquad (4)$$

$$[X-(G-Y)] = K_1(R-Y) \qquad (5)$$

$$[Z-(G-Y)] = K_2(B-Y) \qquad (6)$$

where $K_1$ and $K_2$ are constants. Equations 4, 5, and 6 may be written in the form $$X+Z=4(G-Y) \qquad (7)$$

$$X=K_1(R-Y)+(G-Y) \qquad (8)$$

$$Z=K_2(B-Y)+(G-Y) \qquad (9)$$

or $$K_1(R-Y)+K_2(B-Y)=2(G-Y) \qquad (10)$$

which, using Equation 1, can be written in the form $$K_1(R-Y)+K_2(B-Y)=2\left[-\frac{11}{59}(B-Y)-\frac{30}{59}(R-Y)\right] \qquad (11)$$

$K_1$ and $K_2$ then are found to be $$K_1=-2\frac{30}{59} \qquad (12)$$

$$K_2=-2\frac{11}{59} \qquad (13)$$

X and Z may then be described in terms of $R-Y$ and $B-Y$ as follows:

$$X=-3\left(\frac{30}{59}\right)(R-Y)-\frac{11}{59}(B-Y) \qquad (14)$$

$$Z=-\frac{30}{59}(R-Y)-\frac{33}{59}(B-Y) \qquad (15)$$

from which it follows for example that Z leads the burst which is 180° out of phase with respect to the $B-Y$ signal by 27.2° while X lags the $B-Y$ signal by 102.2°. It also follows that a phase difference of 50.6° exists between the X and Z signals.

Note that since, as can be derived, $$R-Y=0.70R-0.59G-0.11B \qquad (16)$$

$$B-Y=-0.30R-0.59G+0.89B \qquad (17)$$

it follows then that $$Z=-0.188R+0.63G-0.442B \qquad (18)$$

$$X=-1.014R+1.01G+0.002B \qquad (19)$$

showing that the red and green content of X are almost equal, with the blue content greatly diminished. In the Z signal, the greatest color content is that derived from the green signal with the blue and the red color contents progressively less.

Figure 3:
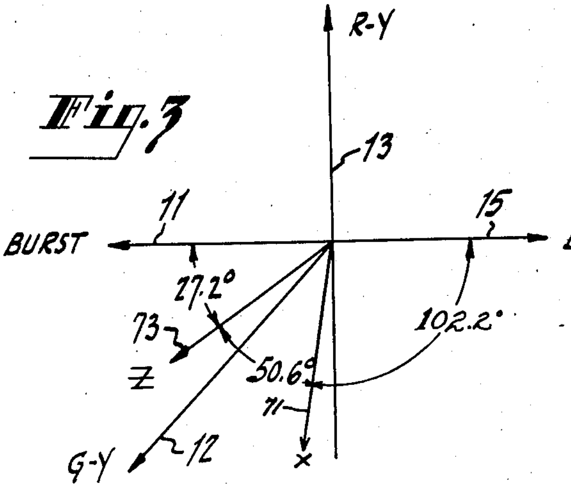
Figure 3 shows the vector relationships between the X and Z signals, the color synchronizing burst signal, and the $R-Y$, $B-Y$, and $G-Y$ signals.

Figure 3 shows the relationship of the X signal 71 and the Z signal 73 in relation to the burst angle signal 11 and the $R-Y$ signal 13, the $B-Y$ signal 15, and the $G-Y$ signal 12. It is seen from Figure 3 that the Z signal 73 leads the burst signal 11 by 27.2° while the X signal 71 in turn leads the Z signal 73 by 50.6°. Note that the X signal contains much cyan information while the Z signal is a hue signal in the colar diagram bounded by yellow information and by green information. It will be understood that if values of $g_m$ and $R_k$ not satisfying Equation 3 are employed, the phases of the X and Z signals may be somewhat different from the phases shown in Figure 3.

Figure 4:
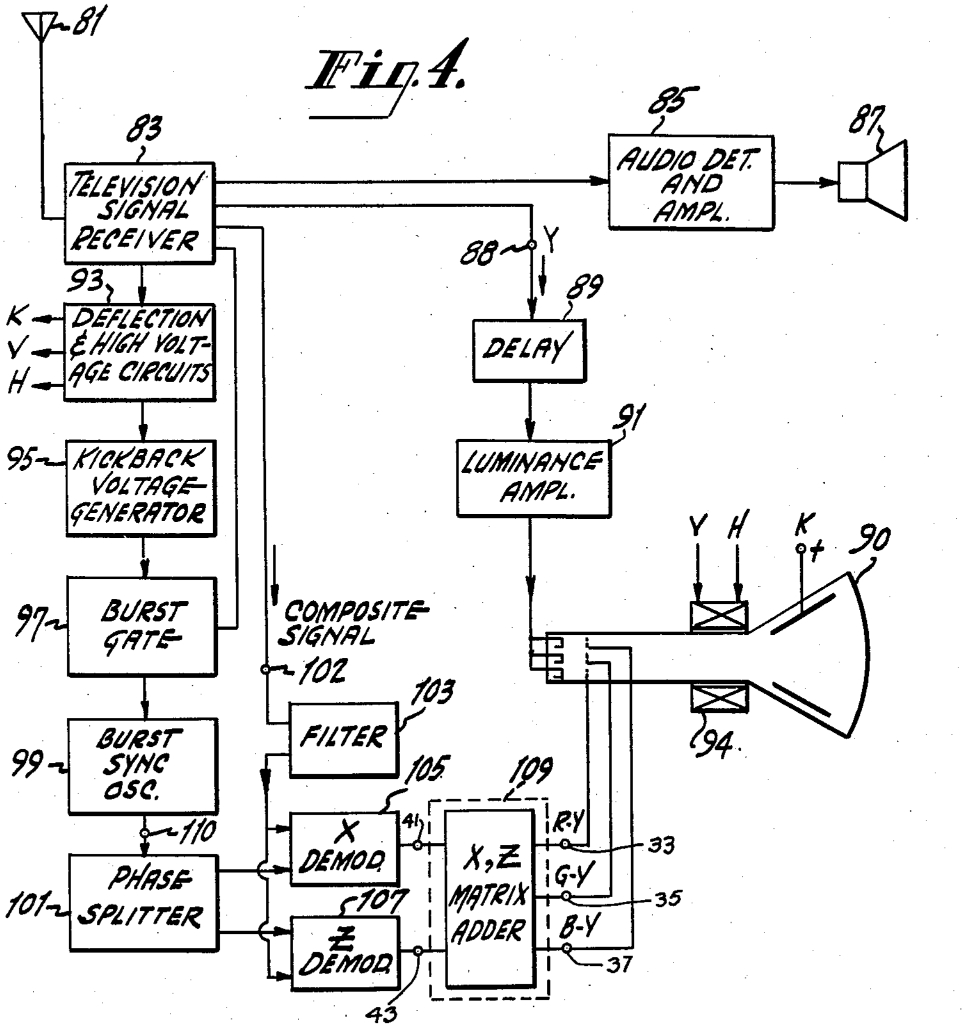
Figure 4 shows the block diagram of a color television receiver which utilizes the present invention.

Having described the present invention in one of its embodiments, consider now the application of this embodiment in a color television receiver. In a color television receiver of the type whose circuit is shown in Figure 4 and which is so designed as to include the present invention, the incoming television signal arrives at the antenna 81 and is applied to the television signal receiver 83. The television signal receiver performs the several functions of radio frequency amplification, first detection, intermediate frequency amplification, and second detection, in addition to numerous auxiliary functions of which automatic gain control is one. The general operation of a television signal receiver is now well known in the art; an excellent detailed discussion of some of the more salient points of television signal receiver design can be found in the article entitled "Television Receivers" by Antony Wright in the March 1947 issue of the "RCA review." The output of the television signal receiver 83 therefore consists of recovered color television signal.

One part of the output of the television signal receiver 83 is concerned with the audio information. Using for example, the well-known principle of intercarrier sound, the color television signal is applied to an audio detector and amplifier 85 wherein the sound information is recovered. This sound information is then applied to the loud speaker 87.

Another branch to which the recovered color television signal proceeds is that which includes the operation of deflection and high voltage supply; thes operations are blocked together in the block entitled "deflection and high voltage circuit 93" which has the several functions of applying the ultor voltage to the kinescope 90, the deflection voltages for the vertical and horizontal deflection yoke 94 and a coupling to the kickback voltage generator 95. The output of the kickback voltage generator is designed to yield substantially a pulse which has a duration interval approximately that of the color synchronizing burst. By impressing this kickback voltage to the burst gate 97 and by permitting the output of the television signal receiver 83 to be applied to the burst gate 97, the burst gate is opened only during approximately the period of the color synchronizing burst and therefore supplies the separated color synchronizing burst to the burst synchronized oscillator 99. There are many methods of producing a locally generated signal which is in phase synchronism with the color synchronizing burst. One, for example, is the method involving ringing circuits; another utilizes a reactance tube controlled oscillator and a phase discriminator; still another involves the use of injection locking circuits. Assuming, for the sake of example, that the color synchronizing burst is applied then to a burst synchronized oscillator 99, the burst synchronized oscillator 99 therefore supplies at its output a locally generated signal which is accurately synchronized with the master oscillator of the color television transmitter. The output of the burst synchronized oscillator 99 is then fed to the phase splitter 101.

The color television signal follows both of two branches —one branch containing Y signal responsive circuits, which accept the composite color television signal in the form of a Y signal, and then pass this Y signal through a delay line 89 and through the luminance amplifier 91 wherefrom the luminance information, amplified to a proper level is applied to the cathode of the color kinescope 90.

In another branch, the color television signal is applied to the filter circuit 103. This filter circuit may either be a band pass filter circuit having a pass band between approximately 2.2 mc. to 4.2 mc., or may be a high pass filter whose cut off frequency is in the neighborhood of 2.2 to 2.5 mc. The output of the filter 103, being a signal from which the luminance information in the frequency range from approximately 0 to 2 mc. has been eliminated, is then fed simultaneously to the X demodulator 105 and the Z demodulator 107.

The X demodulator 105 and the Z demodulator 107, operating in conjunction with properly phased signals produced by the phase splitter 101 then provides demodulations signals suitable for the synchronous deteciion of the X signal in the X demodulator 105 and synchronous detection of the Z signal in the synchronous demodulator 107. The recovered X and Z signals are then applied to the X, Z matrix adder circuit 109 which functions in the manner described in connection with the circuit shown in Figure 2. The output of the X, Z matrix adder 109 consists of three color-difference signals, the $R-Y$ signal, the $G-Y$ signal, and the $B-Y$ signal. These color difference signals are then applied to appropriate control grids of the color kinescope 90 so that with these signals applied to the control grids and the luminance signal applied to the cathode, addition of the luminance information and the color difference information is accomplished at the color kinescope 90; by proper adjustment of signals on the vertical and horizontal deflection windings 94 the transmitted color image may then be reconstructed on the face of the color kinescope 90.

The discussion of the present invention as related to the embodiment shown in Figure 2 and to the application of this embodiment in the color television receiver circuit shown in Figure 4, has taught an improved and simplified approach of achieving three color-difference signals from two detected chrominance signals of prescribed characteristics. However, in yet another form of the invention, it is convenient to combine the circuit of the type shown in Figure 2 with a particular type of synchronous detector circuit in order that not only will the high level gain of the X, Z matrix adder 33 be utilized to yield large amplitude color-difference signals which might be applied directly to appropriate control grids of the color kinescope 90, but also wherein the circuit is adapted to permit full D.-C. restoration.

Figure 5:
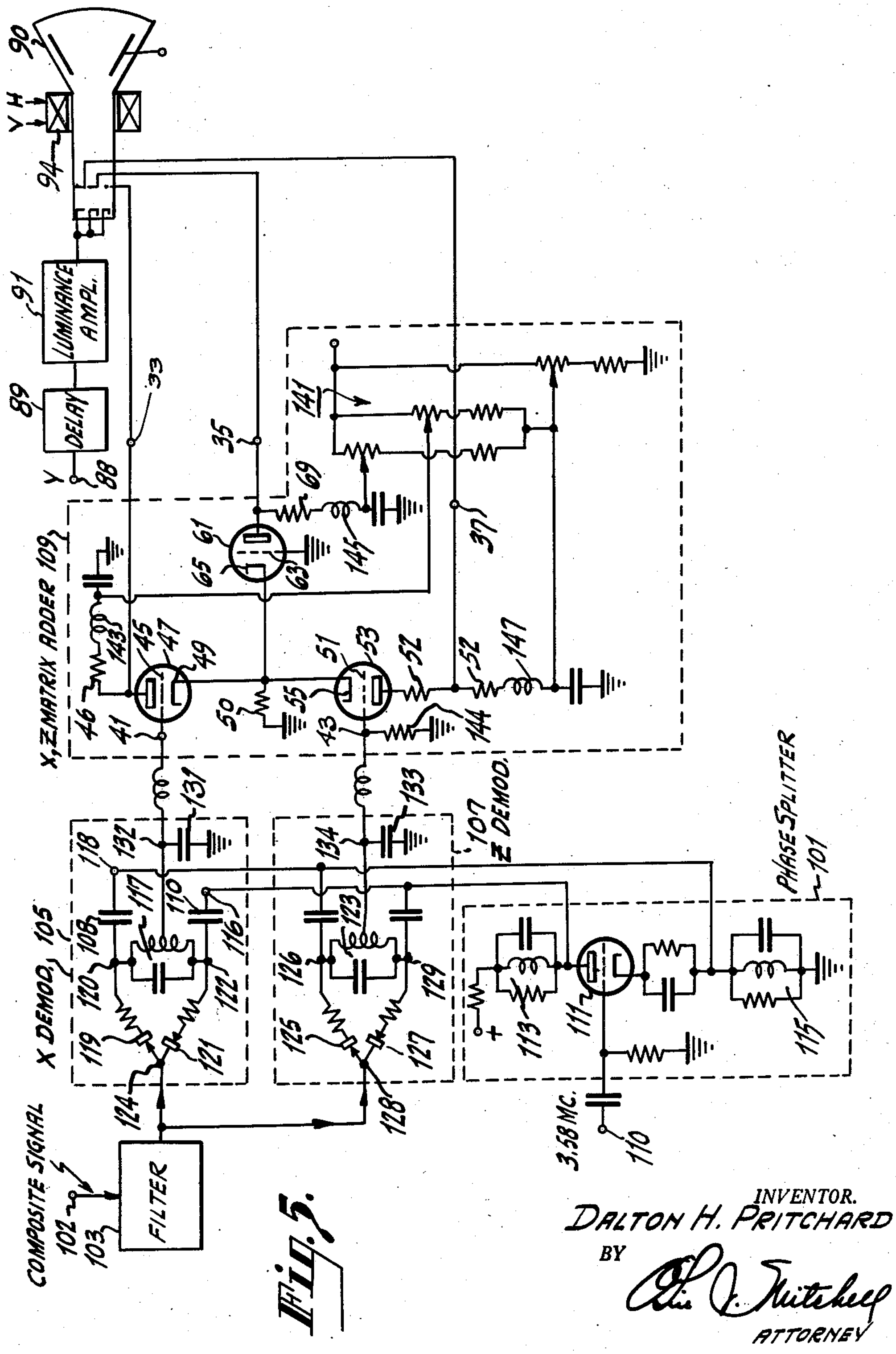
Figure 5 shows a schematic diagram of circuitry useful in the X demodulator, the Z demodulator, and the X, Z matrix-adder in the color television receiver of Figure 4.

The circuit shown in Figure 5 includes the X demodulator 105 and the Z modulator 107 which may be combined with the X, Z matrix adder 109 to permit the D.-C. restoration and the simplicity of circuitry which was described in the preceding paragraph. The circuit shown in Figure 5 follows from that shown in Figure 4 in that it utilizes the terminal 88 from which issues the Y signal, the terminal 102 from which issues the composite color television signal to the filter 103 and the terminal 110 at which point the burst synchronized oscillator 99 presents a 3.58 mc. signal to the phase splitter 101.

The Y signal circuit shown in Figure 5 is identical to that shown in Figure 4 with the Y signal, issuing onto terminal 88, passing through the delay line 89 into the luminance amplifier 91 from which it is applied to the cathodes of the color kinescope 90. In like manner the composite signal is applied from terminal 102 through the filter 103. This filter may have either of two characteristics: it may have band pass filter characteristics in that it will have a pass band from approximately 2.2 or 2.5 to 4.2 mc., or it may actually be merely a high pass filter having a lower cut off frequency at approximately 2.5 mc. The use of a high pass filter rather than a band pass filter will permit simplification in the filter circuitry which will have the advantage of permitting a less expensive circuit component in the filter system to be utilized.

Consider now the phase splitter 101. As shown, the phase splitter 101 circuit includes the vacuum tube 111, the plate resonant circuit 113 which is tuned to the 3.58 mc. signal, and the cathode resonant circuit 115 which is also tuned to the 3.58 mc. signal. One point should be mentioned here, that normally in many types of color television receivers the output of the phase splitter is a series of signals of prescribed phase relative to the color television signal, these signals of prescribed phases being applied directly to each corresponding synchronous demodulator to directly achieve synchronous detection of the color-difference or chrominance signals which are desired. In the circuit shown in Figure 5, because of the very nature of the X demodulator 105 and the Z demodulator 107 which will now be described in detail, it is not necessary that the phase splitter yield signals which may be utilized directly for synchronous detection, but rather the phase splitter 101 is required to yield a pair of signals 180° out of phase and having prescribed phase relationship to the signals which will be synchronously detected in the X demodulator 105 and the Z demodulator 107.

Consider now the operation of the X demodulator 105 and the Z demodulator 107. It is noted from the circuit in Figure 5 that two diodes are used for each of the demodulators, the diodes or rectifiers 121 and 119 being associated with the X demodulator 105, and the diodes or rectifiers 127 and 125 being associated with the Z demodulator 107. D. H. Pritchard and R. N. Rhodes have described applications of diodes for color television signal demodulators in their paper entitled "Color Television Signal Receiver Demodulators" in the "RCA Review" for June 1953. It is to be noted that the X demodulator 105 and the Z demodulator 107 in Figure 5 are not claimed per se in this case; in the copending U. S. patent application entitled "Color Television Synchronous Detectors" by D. H. Pritchard and A. C. Schroeder, this type of synchronous demodulator is described and claimed in detail. However, since the combination of this new type of synchronous demodulator and the X, Z matrix adder achieves such a considerable simplification in circuitry and so great a directness with respect to the achievement of the recovery of the color-difference signals at high level the details of the X demodulator 105 and the Z demodulator 107, operating in conjunction with the X, Z matrix adder 109, are included in this case.

Consider now briefly the operation of the X demodulator 105. The output of the phase splitter 101 yields a pair of signals 180° out of phase. These signals are applied to the input terminals 118 and 116. At the same time the filtered color television signal is applied to the input terminal 124. Return now to the signals which are applied to the terminals 116 and 118; in order for the X demodulator 105 to operate according to one type of circuit adjustment to be described, one of the signals applied by the phase splitter, say to terminal 116, is adjusted to a phase almost exactly half way between the phase of the X and Z signals. The phase of the signal applied to the terminal 118 is then 180° out of phase with respect to this signal which is applied to terminal 116. The resonant circuit 117 is tuned to the frequency of the color subcarrier, that is the 3.58 mc. signal. By detuning this resonant circuit 117 a phase shift will take place with respect to the signal which is presented across the terminals 120 and 122. By proper detuning of this resonant circuit 117 the phase of the signal across the terminals 120 and 122 can be shifted to that corresponding to the phase of the X signal. This is achieved in view of the use of the by-pass condensers 108 and 110. Note from the circuit shown in Figure 5 that the resonant circuit 117 having terminals 120 and 122 and now presenting a signal which has the phase of the X signal, forms one side of a triangular circuit, another side of which includes the rectifier 121 as connected between the terminals 122 and 124 and with a third arm including the rectifier circuit 119 as connected between the terminals 124 and 120. The rectifier 121 is then placed in series with some resistance between the terminal 124 and 122 and the rectifier 119 in series with some resistance is placed in series between the terminal 124 and the terminal 120. As has been mentioned, a signal having the phase of the X signal is developed across the terminals 120 and 122 with the signal at terminal 120 180° out of phase with the signal at terminal 122. The net result of this pair of signals appearing at these terminals is that as the signal at the terminal 120 increases to its maximum potential, current is permitted to flow through the rectifier 119. Also as the potential at the terminal 122 decreases to its minimum the rectifier 121 will also permit conduction. The result of this action is the sampling of the envelope of the color subcarrier at the peaks of the signals which correspond to the X phase. In virtue of the fact that the rectifiers 121 and 119 yield the sampling action, there is a difference between the current which flows into the condenser 131 and the current which flows out of the condenser 131 during every cycle resulting in a potential building up across this condenser 131 which is indicative of the amplitude of the envelope which has been sampled at the peak of the signal having the phase corresponding to the X signal. Therefore a signal appears at terminal 132 which follows the selected portion of the envelope of the color subcarrier corresponding to the X signal. This signal contains not only the X information with respect to alternating current components, but also the D.-C. information therefore yielding D.-C. restoration to the recovered X signal. This X signal is then applied to terminal 41 which is the input terminal to the grid 45 of the vacuum tube 47 which forms one portion of the X, Z matrix adder 109.

In like fashion the phase splitter delivers signals which are impressed across the triangular network of the Z demodulator 107, this triangular network consisting of the tuned circuit 123 having end terminals 126 and 129, the rectifier 125 in series with some resistance which is connected between the terminals 128 and 126 and the rectifier 127 in series with some resistance which is connected between the terminals 128 and 129. As in the case of the I demodulator 127, the resonant circuit 123 is detuned; in this case the detuning yields a signal across this resonant circuit having the phase of the Z signal. By selective sampling of the envelope of the color subcarrier according to the phase of the Z signal, a signal is caused to appear at the terminal 134 which is the high potential point of the condenser 133, this signal appearing at the terminal 134 being the Z signal complete with its D.-C. component. This Z signal is then applied to the terminal 43 which is the input terminal to the grid 51 of the vacuum tube 53 which is one of the members of the X, Z matrix adder 109. The X, Z matrix adder 109 shown in Figure 5 is almost identical to that circuit shown in Figure 2 with the exception of the peaking coils 143, 145, and 147 which are introduced into the plate circuits of the vacuum tubes 47, 61, and 53 respectively; the X, Z matrix adder 109 also utilizes the resistance network 141 so that the individual plate voltages of the various tubes involved can be adjusted.

The resistor 144 is connected between the grid 51 of the tube 53 to ground, to adjust not only the gain of this tube but to achieve overall gain control of the X, Z matrix adder 109 to result in a gain ratio between X and Z according to the ratio of 1.8 to 1.28 respectively. This permits the $R-Y$ and the $B-Y$ signals to be generated according to the amplitude ratios of .877 to .493 respectively which is characteristic of these two signals in a color television system. This adjustment of gain in the matrix amplifier will also yield suitable amplitude level for the $G-Y$ signal which is associated with an amplitude level of 1.42.

One aspect is to be noted in connection with the combination of the circuits shown for the X demodulator 105, the Z demodulator 107 and the phase splitter 101. Since the signals applied by the phase splitter 101 to the terminals 118 and 116 respectively are 180° out of phase, the action of detuning the resonant circuit 117 to provide a phase shift in one direction and detuning of the resonant circuit 123 to provide an equal but opposite phase shift constitutes a balancing of the circuits so that the phase splitter, essentially speaking, works into a balanced system.

The output of the X, Z matrix adder 109 which now yields the R—Y, G—Y, and B—Y signals complete with their D.-C. components may now be applied to the control grids of the color kinescope 90. Since the X, Z matrix adder 109 involves a circuit which yields a high level output, it will be recognized by one skilled in the art that the combination of the X demodulator 105, the Z demodulator 107 and the X, Z matrix adder 109 has accomplished with relatively few circuit components what normally requires a considerable number of matrix and amplifier channel components in many types of color television receivers.

Returning now briefly to the circuit shown in Figure 2, which forms one embodiment of the basic concepts taught by the present invention, it follows that in addition to this circuit being useful for presenting color difference signals in response to two selected chrominance signals, the circuit also has considerable application as a phase splitter network which can accept input signals of the same frequency but with different phases to yield three output signals also having the same frequency but having also different phases. The phases of the new signals and the phases of the input signals will be determined by the parameters of the X, Z matrix adder 31, in particular the transconductance of the vacuum tubes, the plate circuit resistors and the cathode resistor 50. If the circuit is to be used for additional phase splitting and shifting applications it follows that the cathode resistor 50 can be augmented by inductive components in order to yield variations in the various phases of the output signal. In addition it is possible to operate such systems in cascade so that, for example, an X, Z matrix adder 31 can utilize two of its output signals to actuate or yield input signals to a second X, Z matrix adder 31 to yield again a phase splitting mechanism which takes two of the newly produced output signals to yield three more signals of required phases. It follows then that it is possible to continue the cascade effect even further to produce as many signals as are desired with the added attribute of the overall circuit that D.-C. restoration is maintained with the signals and that the signals are produced at very high levels.

Having described the invention, what is claimed is:

1. In a color television receiver, said color television receiver adapted to receive a color television signal, said color television signal including a color subcarrier containing a plurality of color signals, each of said color signals corresponding to a predetermined signal phase, matrix means adapted to accept a first plurality of signals corresponding to a first group of predetermined signal phases in said color subcarrier to yield a second plurality of signals corresponding to a second group of predetermined signal phases, said matrix means comprising in combination, a plurality of transmission networks, each of said transmission networks having a first control electrode, a second control electrode and an output electrode, a mutual impedance coupled to the first control electrode of each of said transmission networks to cause any signal developed in one transmission network to drive each of the other transmission networks, means for coupling each of said plurality of signals to the second control electrode of a prescribed group of said transmission networks corresponding in number to said first plurality of signals, means for utilizing said mutual impedance to produce signal addition of determinable amplitudes and polarities of said first plurality of signals at the output terminals of each of said transmission networks to cause each signal of said second plurality of signals to appear at the output terminal of one of said plurality of transmission networks.

2. In a color television receiver, said color television receiver adapted to receive a color television signal, said color television signal including a color subcarrier, said color subcarrier containing a plurality of color signals, each of said color signals corresponding to a predetermined signal phase, said color television signal also including a color synchronizing burst, said color subcarrier including G—Y, R—Y, B—Y, X, and Z signals all having predetermined phase relationships with respect to said phase of said color synchronizing burst, matrix means, said matrix means adapted to accept signals corresponding to X and Z signals and to produce output signals corresponding to B—Y, R—Y, and G—Y signals, comprising in combination, a first synchronous demodulator for producting an X signal, a Z synchronous demodulator for producing a Z signal, a first amplifier circuit, a second amplifier and a third amplifier circuit, each of said amplifier circuits including an input circuit, a control electrode and an output circuit, a fixed potential terminal, means for applying said X signal to the input circuit of said first amplifier circuit, means for applying said Z signal to the input circuit of said second amplifier circuit, a mutual impedance network coupled mutually to the control electrodes of said first, second, and third amplifier circuit whereby the R—Y signal appears in the output circuit of said first amplifier circuit, the B—Y signal appears in the output circuit of said second amplifier circuit, and the G—Y signal appears in the output circuit of said third amplifier circuit.

3. In a color television receiver adapted to receive a color television signal, said color television signal including a color subcarrier containing a plurality of color signals, each of said color signals corresponding to a predetermined signal phase, said color television signal also including a color synchronizing burst, said color subcarrier including G—Y, R—Y, B—Y, X and Z signals all having predetermined phase relationships with respect to said phase of said color synchronizing burst, matrix means, said matrix means adapted to accept signals corresponding to X and Z signals and to produce output signals corresponding to B—Y, R—Y, and G—Y signals, comprising in combination, said matrix means including three amplifier tubes, each of said three tubes having a control grid, an anode, and a cathode, a fixed potential terminal, an impedance, means for connecting the cathodes of said three amplifier tubes together to form a common cathode terminal, means for coupling said impedance between said common cathode terminal and said fixed potential terminal, means for coupling a signal corresponding to said X signal to the control grid of the first of said three amplifier tubes, means for coupling the signal corresponding to said Z signal to the control grid of the second of said three amplifier tubes, means for coupling the control grid of the third of said three amplifier tubes to said fixed potential terminal, a first output circuit coupled to the anode of the first of said three amplifier tubes, said second output circuit coupled to the anode of the second of said amplifier tubes, a third output circuit coupled to the anode of the third of said three amplifier tubes, means for adjusting the gain of each of said three amplifier tubes whereby an R—Y signal is produced in said first output circuit, a B—Y signal is produced in said second output circuit, and a G—Y signal is produced in said third output circuit.

4. The invention as set forth in claim 3 and wherein said X and Z signals are separated by approximately 50.6° with the X signal lagging the B—Y signal by a phase angle of approximately 102.2°.

5. The invention as set forth in claim 3 and wherein said X and Z signals have a phase difference in the range from 40° to 60° with the X signal lagging the B—Y signal by a phase angle in the range from 90° to 110°.

6. In a color television receiver adapted to receive a color television signal including a color subcarrier, said color subcarrier containing a plurality of color signals, each of said color signals corresponding to a predetermined signal phase, said color television signal also including a color synchronizing burst, said color subcarrier including G—Y, R—Y, B—Y, X and Z signals all having predetermined phase relationships with respect to said phase of said color synchronizing burst, matrix means adapted to accept signals corresponding to X and Z signals and to produce output signals corresponding to B—Y, R—Y, and G—Y signals, comprising in combination three amplifier devices, each of said three amplifier devices having at least a first control electrode, a second control electrode, and an output electrode, a fixed potential terminal, an impedance, means for connecting the first control electrodes of each of said three amplifier devices together to form a common first control terminal, means for coupling said impedance between said common first control terminal and said fixed potential terminal to cause any signal developed in one amplifier device to be developed in the other amplifier devices and to develop a signal addition across said impedance of signals applied to said second control electrodes, means for demodulating an X signal from said color subcarrier, means for coupling said X signal to said second control electrode of the first of said three amplifier devices, means for demodulating a Z signal from said color subcarrier, means for coupling said Z signal to said second control electrode of the second of said three amplifier devices, means for coupling said second control terminal of the third of said three amplifier devices to said fixed potential terminal, a first output circuit, means for coupling said first output circuit to the output electrode of the first of said three amplifier devices, a second output circuit, means for coupling said second output circuit to the output electrode of the second of said three amplifier devices, a third output circuit, means for coupling said third output circuit to the output electrode of the third of said three amplifier devices, means for adjusting the amplitude of said X and Z signals to cause an R—Y signal to be developed in said first output circut, and said B—Y signal appears in said second output circuit and said G—Y signal to be developed in said third output circuit.

7. In a color television receiver adapted to receive a color television signal including a color subcarrier and a color synchronizing burst, said color subcarrier including G—Y, R—Y, B—Y, X and Z signals all having predetermined phase relationships with respect to said phase of said color synchronizing burst, matrix means adapted to accept signals corresponding to X and Z signals and to produce output signals corresponding to B—Y, R—Y, and G—Y signals, comprising in combination, an X demodulator adapted to yield an X signal from said color subcarrier, a Z demodulator adapted to yield a Z signal from said color subcarrier, said X and Z signals having a phase difference in the neighborhood of 50° with said X signal lagging said B—Y signal by a phase angle in the vicinity of 100°, three amplifier devices, each of said three amplifier devices having at least a first control electrode, a second control electrode, and an output electrode, a fixed potential terminal, an impedance, means for connecting the first control electrodes of each of said three amplifier devices together to form a common first control terminal, means for coupling said impedance between said first control terminal and said fixed potential terminal to cause any signal developed in one amplifier device to be produced in each of the other amplifier devices and to cause signal addition across said impedance of signals applied to said first control electrodes, means for coupling said X signal from said X demodulator to said second control electrode of the first of said three amplifier devices, means for coupling said Z signal from said Z demodulator to the second control electrode of said second of said three amplifier devices, a first output circuit, means for coupling said first output circuit to the output electrode of the first of said three amplifier devices, a second output circuit, means for coupling said second output circuit to the output electrode of the second of said three amplifier devices, a third output circuit, means for coupling said third output circuit to the output electrode of the third of said three amplifier devices, potential and bias means, means for adjusting the amplitude of said X and Z signals whereby an R—Y signal appears in said first output circuit, and said B—Y signal appears in said second output circuit and said G—Y signal appears in said third output circuit.

8. The invention as set forth in claim 7 and wherein said X demodulator and Z demodulator are each adapted to include apparatus whereby said color subcarrier amplitude is sampled according to phases related to said X signal and Z signal respectively.

9. In a color television receiver adapted to receive at least a chrominance signal, the combination of, means to demodulate a first and second color difference signal from said chrominance signal corresponding to prescribed angles of said chrominance signal, a plurality of amplifiers having a mutual cathode resistor, means for applying said first and second color difference signals to selected amplifiers of said plurality, means for adding selected amplitudes and polarities of said first and second color difference signals in said plurality of amplifiers to develop at least a trio of color difference signals corresponding to angles of said chrominance signal other than said prescribed angles.

10. In a color television receiver adapted to receive at least a chrominance signal, the combination of, demodulator means to demodulate a first and second color difference signals from said chrominance signal corresponding to information at determinable angles of said chrominance signal, a trio of electron stream devices each having output circuits and coupled to cause modulation introduced in one electron stream to provide corresponding modulations in the other electron stream devices, means for modulating the electron streams of a pair of said trio with said first and second color difference signals respectively, means for causing signal addition in each of said trio due to said coupling to develop each of a trio of color difference signals corresponding to angles of said chrominance signal other than the angles corresponding to said first and second color difference signals in each output circuit.

11. In a color television receiver adapted to receive a color television signal including a chrominance signal wherein different color difference signals occur at different phases; the combination of: a first demodulator means to demodulate a first color difference signal from a first phase of said chrominance signal, a second demodulator means to demodulate a second color difference signal from a second phase of said chrominance signal, a first and second electron tube each having a cathode and an anode and a control electrode, a fixed potential point, a cathode resistor coupled from the cathodes of said first and second electron tubes to said fixed potential means, circuit means coupled between the anodes of said first and second electron tubes and said fixed potential point to render said first and second electron tubes operative whereby signals applied to the control electrodes of said first and second electron tubes will be combined across said cathode resistor, means coupling said first and second demodulator means to the control electrodes of said first and second electron tubes respectively to apply said first and second color difference signals to the control electrodes of said first and second electron tubes respectively whereby a third color difference signal representing signal combinations of prescribed polarities of said first and second color difference signals is developed across said cathode resistor.

12. In a color television receiver adapted to receive a color television signal including a chrominance signal wherein different color difference signals occur at different phases, the combination of: a first demodulator means to demodulate a first color difference signal from a first phase of said chrominance signal, a second demodulator means to demodulate a second color difference signal from a second phase of said chrominance signal, a first and second amplifier each having an input terminal and a cathode and both having a common output load operatively connected therewith to each cathode to produce a signal combination of signals applied to the input terminals of said first and second amplifiers, and means coupling said first and second demodulator means to the input terminals of said first and second amplifiers respectively to develop a color difference signal representing a signal combination of said first and second color difference signals across said common output load.

13. In a color television receiver adapted to receive a color television signal including a chrominance signal wherein different color difference signals occur at different phases, the combination of: first demodulator means to demodulate a first color difference signal from a first phase of said chrominance signal, second demodulator means to demodulate a second color difference signal from a second and different phase of said chrominance signal, an amplifier having an input circuit and a first and second output load and operatively connected to develop different polarities of a signal across said first and second output loads in response to that signal applied to said input circuit, means coupling said first demodulator means to said input circuit to apply said first color difference signal to said input circuit to develop different polarities of said first color difference signal across said first and second output loads, and means coupling said second demodulator means to one of said first and second output loads to produce a signal combination of said first and second color difference signals across at least one of said first and second output loads.

14. In a color television receiver adapted to receive a color television signal including a chrominance signal wherein different color difference signals occur at different phases, the combination of: a first demodulator means to demodulate a first color difference signal from a first phase of said chrominance signal; a second demodulator means to demodulate a second color difference signal from a second phase of said chrominance signal; a first and second amplifier each having an independent output load and an input circuit and both having a common output load operatively connected thereto to develop a signal in one polarity across the output load of one amplifier and in a second polarity across the common output load and the output load of the other amplifier in response to that signal applied to the input circuit of the first named amplifier, means coupling said first and second demodulator circuits to the input circuits of said first and second amplifiers respectively to apply said first and second color difference signal to the input circuits of said first and second amplifiers respectively whereby the same polarity of said first and second color difference signals are produced across said common output load and different combinations of different polarities of said first and second color difference signals are produced across the independent output loads of said first and second amplifiers.

15. In a color television receiver adapted to receive a color television signal including a chrominance signal wherein different color difference signals occur at different phases, the combination of: a first demodulator means to demodulate a first color difference signal from a first phase of said chrominance signal; a second demodulator means to demodulate a second color difference signal from a second phase of said chrominance signal; a first and second amplifier each having an independent output load and an input circuit and both having a common output load operatively connected thereto to develop a signal in one polarity across the output load of one amplifier and in a second polarity across the common output load and the output load of the other amplifier in response to that signal applied to the input circuit of the first named amplifier, means coupling said first and second demodulator circuits to the input circuits of said first and second amplifiers respectively to apply said first and second color difference signal to the input circuits of said first and second amplifiers respectively whereby the same polarity of said first and second color difference signals are produced across said common output load and different combinations of different polarities of said first and second color difference signals are produced across the independent output loads of said first and second amplifiers, and a third amplifier device coupled to said common output load to amplify said signal comprising the same polarity of said first and second color difference signals produced across said common output load.

16. In a color television receiver, the combination of: an electron tube having a cathode, anode and control grid, a fixed potential point, a cathode load coupled between said cathode and said fixed potential point, an anode load coupled to said anode, potential means coupled between said anode load and said fixed potential point to render said electron tube operative whereby a signal applied to said control grid is developed in a first polarity across said cathode load and in a second polarity across said anode load and whereby a signal applied to said cathode load is developed in the same polarity across both said anode and cathode loads, means to apply a first color difference signal corresponding to information occurring at a first phase of a received chrominance signal to said control grid, means to apply a second color difference signal corresponding to information occurring at a second phase of said received chrominance signal to said cathode load whereby the same polarities of said first and second color difference signals are produced across said cathode load and different polarities of said first and second color difference signals are produced across said anode load.

17. In a color television receiver adapted to receive a chrominance signal wherein different color difference signals occur at different phases measured with respect to a reference phase, said different color difference signals including red, blue and green color difference signals occurring at first, second and third phases respectively and including fourth and fifth color difference signals which occur at phases which lead said reference phase by approximately 27° and 77° respectively, said fourth and fifth color difference signals capable of being combined in the same polarity to form a green color difference signal, said red color difference signal capable of being formed by combining said fourth color difference signal with the opposite polarity of said fifth color difference signal, said blue color difference signal capable of being formed by combining said fifth color difference signal with the opposite polarity of said fourth color difference signal, said receiver also adapted to receive color synchronizing bursts having said reference phase, the combination of: first and second demodulator means coupled to said receiver and responsive to said chrominance signal and said bursts to demodulate said fourth and fifth color difference signals respectively from said phases leading said reference phase by approximately 27° and 77° in said chrominance signal, a first and second amplifier each having an input circuit and an independent output circuit and both having a common output circuit operatively connected thereto to develop a signal applied to the input circuit of one of said first and second amplifiers in the opposite polarity in the independent output circuit of that amplifier and in the same polarity in said common output circuit and in the independent output circuit of the other amplifier, means coupling said first and second demodulator circuits to the input circuits of said first and second amplifiers respectively to apply said fourth and fifth color difference signals to the input circuits of said first and second amplifier circuits respectively whereby said green, blue and red color difference signals are developed across the independent output circuits of said first and second amplifiers and said common output circuit respectively.

18. In a color television receiver adapted to receive a chrominance signal wherein occur modulations related to different color difference signals at different phases, each of said color difference signals capable of being formed by signal combination of certain ones of others of said color difference signals, the combination of: a first and second amplifier each having an input circuit and an independent output circuit and both having a common output circuit operatively connected thereto to develop a signal applied to the input circuit of one of said first and second amplifiers in a first polarity in the output circuit of that amplifier and in a second and opposite polarity in the output circuit of the other amplifier and in the common output circuit, means to apply a first color difference signal corresponding to a modulation occurring at a first phase of said chrominance signal to said input circuit of said first amplifier, and means to apply a second color difference signal corresponding to modulations occurring at a second phase of said chrominance signal to the input circuit of said second amplifier whereby signal combinations of polarities of said first and second color difference signals are produced in said common output circuit and in the output circuits of said first and second amplifiers to develop a trio of different color difference signals each different from said first and second color difference signals.

19. In a color television receiver adapted to receive a chrominance signal including modulations representative of different color difference signals which occur at different phases of said chrominance signal, the combination of: a first, second and third amplifier tube each having a control grid and an anode and a cathode, means to couple said cathodes together to form a common cathode terminal, a fixed potential terminal, a common load impedance coupled between said common cathode terminal and said fixed potential terminal, a first, second and third anode load coupled to the anodes of said first, second and third amplifier tubes respectively, potential means coupled between said first, second and third anode loads and said fixed potential terminal, means to couple the control grid of said first amplifier tube to said fixed potential point, means to apply a first color difference signal corresponding to modulations occurring at a first phase of said chrominance signal to the control grid of said second amplifier tube, means to apply a second color difference signal corresponding to modulations occurring at a second phase of said chrominance signal to the control grid of said third amplifier tube whereby a color difference signal representing signal combination of said first and second color difference signals is developed across said common load impedance and the first anode load and whereby different combinations of different polarities of said first and second color difference signals are developed across said second and third anode loads respectively.

20. In a color television receiver adapted to receive a chrominance signal wherein modulations occurring at different phases correspond to different color difference signals, the combination of: a first and second amplifier tube each having a cathode and an anode and a control grid, a connection to connect the cathodes of said first and second amplifier tubes together to form a common cathode terminal, a fixed potential point, impedance means coupled between said common cathode terminal and said fixed potential point, an anode load coupled to the anode of said first amplifier tube, circuit means including potential means coupled between the anode of said first amplifier tube and the anode load of each second amplifier tube and said fixed potential terminal to render said first and second amplifier tubes operative, means to apply a first color difference signal corresponding to modulations occurring at a first phase of said chrominance signal to said control grid of said first amplifier tube and means to apply a second color difference signal corresponding to modulations occurring at a second phase of said chrominance signal to said control grid of said second amplifier tube to thereby develop a color difference signal representing a first signal combination of the same polarity of said first and second color difference signals across said impedance means and to develop a different color difference signal representing a second signal combination of different polarities of said first and second color difference signals across said anode load.

References Cited in the file of this patent

UNITED STATES PATENTS

| | | |
|---|---|---|
| 2,570,716 | Rochester | Oct. 9, 1951 |
| 2,590,950 | Eckert | Apr. 1, 1952 |
| 2,600,744 | Eckert | June 17, 1952 |
| 2,745,900 | Parker | May 15, 1956 |
| 2,754,356 | Espenlaub | July 10, 1956 |

OTHER REFERENCES

Color TV, Rider Pub., March 1954, pages 141, 142. Copy in Div. 16.